United States Patent [19]

Kristiansen et al.

[11] 3,856,948
[45] Dec. 24, 1974

[54] INSECTICIDAL PHOSPHORIC ACID ESTERS
[75] Inventors: Odd Kristiansen; Kurt Gubler, both of Riehen/BS, Switzerland
[73] Assignee: Ciba-Geigy Corporation, Ardsley, N.Y.
[22] Filed: Apr. 11, 1973
[21] Appl. No.: 350,293

Related U.S. Application Data
[62] Division of Ser. No. 69,893, Sept. 4, 1970, Pat. No. 3,733,376.

[30] Foreign Application Priority Data
Sept. 10, 1969   Switzerland...................... 13751/69

[52] U.S. Cl................................ 424/212, 424/211
[51] Int. Cl............................................... A01n 9/36
[58] Field of Search............................. 424/212, 211

[56] References Cited
UNITED STATES PATENTS

| 3,229,000 | 1/1966 | Lorenz et al.......................... | 260/943 |
|---|---|---|---|
| 3,278,648 | 10/1966 | Turner et al......................... | 260/941 |
| 3,369,062 | 2/1968 | Ward.................................... | 260/943 |
| 3,733,376 | 5/1973 | Kristiansen et al................. | 260/941 |

*Primary Examiner*—Albert T. Meyers
*Assistant Examiner*—Leonard Schenkman
*Attorney, Agent, or Firm*—Frederick H. Rabin

[57] ABSTRACT

Insecticidal phosphoric acid esters of the formula

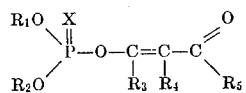

wherein
 X represents oxygen or sulphur,
 $R_1$ and $R_2$ each independently represent a lower alkyl radical,
 $R_3$ represents hydrogen, an alkoxycarbonyl or halogenemethyl radical,
 $R_4$ represents a lower alkoxy, alkylthio or dialkylamino radical and
 $R_5$ represents a lower alkoxy radical, or
 $R_4$ represents a lower alkylthio radical and
 $R_5$ represents a dialkylamino radical, are disclosed.

14 Claims, No Drawings

INSECTICIDAL PHOSPHORIC ACID ESTERS

This is a division of application Ser. No. 69,893, filed on Sept. 4, 1970 now U.S. Pat. No. 3,733,376.

DESCRIPTION OF DISCLOSURE

The present invention concerns new phosphoric acid esters, process for the production thereof as well as pesticidal compositions containing these new phosphoric acid esters as active ingredients and method for the control of pests using the new active substances or compositions containing them.

The new phosphoric acid esters correspond to the Formula I

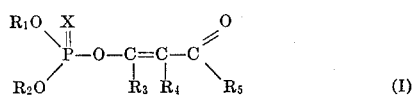

In this formula:

X represents oxygen or sulphur;

$R_1$ and $R_2$ each independently represent a lower alkyl radical;

$R_3$ represents hydrogen, an alkoxycarbonyl or halogenomethyl radical;

$R_4$ represents a lower alkoxy, alkylthio or dialkylamino radical and $R_5$ represents a lower alkoxy radical; or $R_4$ represents a lower alkylthio radical and $R_5$ represents a dialkylamino radical.

In Formula I, by lower alkyl radicals $R_1$ and $R_2$ and in $R_3$, $R_4$ and $R_5$ are meant radicals having 1 to 5 carbon atoms such as methyl, ethyl, n-propyl, isopropyl, n-butyl, sec-butyl, isobutyl, tert-butyl or pentyl. The radicals $R_1$ and $R_2$ may be identical or different radicals. Such lower alkyl radicals form the alkyl moiety of alkoxy and alkylthio radicals; they also form the alkyl substituents of a dialkylamino group and the alkyl moiety in alkoxycarbonyl raadicals $R_3$. A halogeno-methyl radical $R_3$ is in particular the trifluoromethyl radical.

The new phosphoric acid esters of Formula I are produced according to the invention by reacting a compound of the Formula II

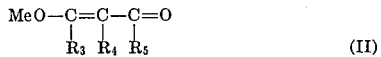

wherein Me represents an alkali metal atom, with a phosphoric acid halide of the Formula III

wherein Hal represents chlorine or bromine. In the formulas II and III, the symbols $R_1$ to $R_5$ and X have the meanings given for Formula I. Preferably, the reactions are performed in the presence of solvents or diluents inert towards the reaction components. For this purpose aromatic hydrocarbons and halogenated hydrocarbons such as benzene, toluene, xylenes and chlorobenzene have proved suitable; furthermore aliphatic hydrocarbons, ethers, etc. are also suitable. The reaction temperatures are between 0° and 100°C, preferably between 0° and 20°C.

The starting materials of Formula II are known compounds or can be produced by known methods by the condensation of the appropriate esters in the presence of condensation agents. Suitable as ester components are, on the one hand, alkoxyacetic acid esters, alkylthio-acetic acid esters, alkylthioacetic acid amides, and on the other hand formic acid esters, halogenomethyl-acetic acid ester, and oxalic acid esters; as condensation agents the alkali alkanolates corresponding to the esters as well as alkali metal hydrides are employed.

The new phosphoric acid esters of Formula I have excellent insecticidal and good acaricidal properties. Due to their good effect as stomach poison and contact poison, they are suitable for the control of biting and sucking insects in the protection of plants and stored goods. Furthermore, their favorable toxicity for warm-blooded animals permits their use in veterinary medicine and hygiene. The $DL_{50}$ for rats per os of the new active substances of Formula I is up to 500 mg/kg of body weight; whereas the $DL_{50}$ of known phosphoric acid esters which are commmercially available, such as firstly O,O-dimethyl O-(1-methyl-2-chloro-2-diethylcarbamyl-vinyl) phosphate [cf. Belgian patent No. 552,234, trade name "Phosphamidon"] and secondly O,O-dimethyl O-(1-methyl-2-methoxycarbonyl-vinyl) phosphate [cf. U.S. Pat. No. 2,685,552, trade name "Phosdrin"], for rats per os is below 50 mg/kg of body weight. In addition, the action of the active substances according to the invention starts more rapidly and continues longer than is the case by the above-mentioned known phosphoric acid esters.

Furthermore, it has been found that these active substances of the Formula I have in particular an excellent, long-lasting effect against insects of the families Muscidae, Stomoxidae and Culicidae, e.g., against the polyvalent-resistant and normally sensitive house flies (*Musca domestica*), stable flies (*Stomoxys calcitrans*) and mosquitoes (e.g., *Aedes Aegypti*, *Culex fatigans*, *Anophenles stephensi*); against insects of the families Curculinidae, Bruchididae, Dermestidae, Tenebrionidae and Chrysomelidae, e.g., granary weevils (*Sitophilus granarius*), bean beetles (*Bruchidus obtectus*), larder beetles (*Dermestes vulpinus*), mealworms (*Tenebrio molitor*), Colorado potato beetles (*Leptinotarsa decemlineata*) and their larval stages; against insects of the family Pyralididae, e.g., Mediterranean flour moths (*Ephestia kuhniella*), of the family Blattidae, e.g., cockroaches (*Phyllodromia germanical*, *Periplaneta americana*, *Blatta orientalis*), of the family Aphididae, e.g., bean aphids (*Aphis fabae*), of the family Pseudococcidae, e.g., citrus mealybugs (*Planococcus citri*) and of the family Locustidae, e.g. migratory locusts (*Locusta migratoria*).

In addition, the active substances of the Formula I according to the invention have a good effect against the larval and adult stages pf arachnids, e.g., of the families Acarinae, Ixodidae, Arachnidae and Argasidae.

In admixture with synergists and auxiliaries having a similar action such as dibutyl succinate, piperonyl butoxide, olive oil, and peanut oil, etc., the range of action of the said active substances can be broadened and in particular the insecticidal action can be improved. Likewise, the insecticidal action can be substantially broadened and adjusted to the prevailing conditions by the addition of other insecticides such as, for example, phosphoric, phosphonic, thio- and dithiophosphoric acid esters and amides, halogenated hydrocarbons and analogs of 1,1-p,p'-dichlorophenyl-2,2,2-trichloroethane as well as pyrethrines and synergists thereof, acaricidally active substances such as halogenobenzilic acid esters such as 4',4'-dichlorobenzilic acid esters and 4',4'-dibromobenzilic acid esters, insecticidal and acacicidal carbamates, for example oxime carbamates, aryl carbamates and carbamates of heterocyclic compounds which are enolizable.

Insecticidal Action:

The insecticidal action of the new phosphoric acid esters is illustrated by the following tests:

1. Effect as insecticidal contact poison a. Petri dishes are coated with acetone solutions of the active substances so that they are covered with 0.15 mg and 1.5 mg of active substance per square meter. After one hour the following test animals are placed in the dishes:

1. polyvalent-resistant house flies (*Musca domestica*),
2. mosquitoes (*Aedes aegypti*)

In Table 1 the time is given after which all (100 percent) of the animals are in dorsal position.

b. 20 mg of a 1 percent dust are evenly distributed in Petri dishes. Cockroaches (*Phyllodromia germanica* and *Periplaneta americana*) are then placed in the dishes and kept under normal conditions at 22°–24°C.

In Table 2 the time is given after which all of the animals are in dorsal position.

c. Granary weevils are sprayed from a distance of 10 cm with 2 cubic centimeters of a 1 percent solution of the active substance in acetone. Immediately after application the animals are transferred to clean Petri dishes and kept at 22°C. In Table 3 the time is given after which all (100 percent) of the animals are in dorsal position.

Table 1

| Active Substance | 100% of the animals in dorsal position after x minutes | | |
|---|---|---|---|
| | house flies | | mosquitoes |
| | 1.5 mg/m² | 0.15 mg/m² | 0.15 mg/m² |
| 0,0-dimethyl 0-(2-methoxy-2-methoxycarbonyl-vinyl) phosphorothioate | 10' | 30' | 10' |
| 0,0-dimethyl 0-(2-methoxy-2-methoxycarbonyl-vinyl) phosphate | 8' | 22' | 4' |
| 0,0-diethyl 0-(2-methoxy-2-methoxycarbonyl-vinyl) phosphate | 30' | 60' | 2' |
| 0,0-dimethyl 0-(1-ethoxycarbonyl-2-methoxy-2-methoxycarbonyl-vinyl) phosphate | 60' | — | — |
| 0,0-diethyl 0-(1-ethoxycarbonyl-2-methoxy-2-methoxycarbonyl-vinyl) phosphate | 60' | 60' | 10' |
| 0,0-diethyl 0-(1-trifluoromethyl-2-methoxy-2-methoxycarbonyl-vinyl)-phosphate | 10' | 60' | 10' |
| 0,0-dimethyl 0-(2-methylthio-2-N,N-dimethylcarbamyl-vinyl) phosphate | 40' | 100' | 18' |
| 0,0-diethyl 0-(2-methylthio-2-N,N-dimethylcarbamyl-vinyl) phosphate | 40' | — | 23' |
| 0,0-dimethyl 0-(2-ethylthio-2-N,N-dimethylcarbamyl-vinyl) phosphate | 25' | 45' | 12' |
| 0,0-dimethyl 0-(2-isopropylthio-2-N,N-dimethyl-carbamyl-vinyl) phosphate | 27' | 33' | 6' |
| 0,0-dimethyl 0-(1-trifluoromethyl-2-methylthio-2-methoxycarbonyl-vinyl) phosphate | — | — | 10' |
| 0,0-diethyl 0-(2-methylthio-2-N,N-dimethylcarbamyl-vinyl) phosphorothioate | — | — | 20' |
| 0,0-dimethyl 0-(2-ethylthio-2-N,N-dimethylcarbamyl-vinyl) phosphorothioate | — | — | 19' |
| 0,0-diethyl 0-(2-isopropylthio-2-N,N-dimethylcarbamyl-vinyl) phosphorothioate | — | — | 18' |
| 0,0-diethyl 0-(2-isopropylthio-2-N,N-dimethylcarbamyl-vinyl) phosphate | — | — | 6' |
| 0,0-dimethyl 0-(1-methyl-2-chloro-2-N,N-diethylcarbamyl-vinyl) phosphate (Phosphamidon, known from Belgian patent No. 552,284) | 2 h | 24 h | 30' |

Table 2

| Active Substance | 100% of the animals in dorsal position after x minutes cockroaches |
|---|---|
| 0,0-dimethyl 0-(2-methoxy-2-methoxycarbonyl-vinyl) phosphorothioate | 17' |
| 0,0-dimethyl 0-(2-methoxy-2-methoxycarbonyl-vinyl) phosphate | 17' |
| 0,0-diethyl 0-(2-methoxy-2-methoxycarbonyl-vinyl) phosphate | 31' |
| 0,0-dimethyl 0-(2-ethylthio-2-N,N-dimethylcarbamyl-vinyl) phosphorothioate | 85' |
| 0,0-dimethyl 0-(1-methyl-2-chloro-2-N,N-diethylcarbamyl-vinyl) phosphate (see Table 1) | 61' |

Table 3

| Active Substance | 100% of the animals in dorsal position after x minutes or hours granary weevils |
|---|---|
| 0,0-dimethyl 0-(2-methoxy-2-methoxycarbonyl-vinyl) phosphorothioate | 6 h |
| 0,0-dimethyl 0-(2-methoxy-2-methoxycarbonyl-vinyl) phosphate | 20 h |
| 0,0-diethyl 0-(2-methoxy-2-methoxycarbonyl-vinyl) phosphate | 60' |
| 0,0-dimethyl 0-(2-methylthio-2-N,N-dimethylcarbamyl-vinyl) phosphorothioate | 2 h |
| 0,0-diethyl 0-(2-methylthio-2,N,N-dimethylcarbamyl-vinyl) phosphorothioate | 7 h |
| 0,0-dimethyl 0-(2-methylthio-2,N,N-dimethylcarbamyl-vinyl) phosphate | 90' |
| 0,0-dimethyl 0-(2-ethylthio-2-N,N-dimethylcarbamyl-vinyl) phosphate | 90' |
| 0,0-diethyl 0-(2-ethylthio-2-N,N-dimethylcarbamyl-vinyl) phosphate | 133' |
| 0,0-diethyl 0-(2-isopropylthio-2,N,N-dimethylcarbamyl-vinyl) phosphorothioate | 8 h |
| 0,0-dimethyl 0-(2-isopropylthio-2-N,N-dimethylcarbamyl-vinyl) phosphate | 90' |
| 0,0-diethyl 0-(2-isopropylthio-2-N,N-dimethylcarbamyl-vinyl) phosphate | 90' |
| 0,0-dimethyl 0-(1-methyl-2-chloro-2-N,N-diethylcarbamyl-vinyl) phosphate (see Table 1) | 48 h |

2. Long-lasting insecticidal effect a. Petri dishes which have been coated with 0.15 mg and 1.5 mg of active substance per square meter are allowed to stand for 8 days at 24°C. Then polyvalent-resistant house flies (Musca domestica) and granary weevils (Sitophilus granaria) are placed on the coatings.

b. The active substances are applied from an aqueous suspension in a concentration of 1 g per square meter to wooden boards. The treated boards are suspended in stables for several days. A control is made after 1 and 8 days by taking the boards into the laboratory and placing stable fly maggots (Stomoxys calcitrans) and mosquitoes (normally sensitive Aedes aegypti) on them.

In the following Tables 4 and 5, the time is given in minutes and in hours after which the animals (100 percent) are in dorsal position.

Table 4

| Active Substance | 100% of the animals in dorsal position after X minutes or hours | |
|---|---|---|
| | flies 1.5 mg/m$^2$ | weevils 0.15 mg/m$^2$ |
| 0,0-dimethyl 0-(2-methoxy-2-ethoxycarbonyl-vinyl) phosphorothioate | 12' | 60' |
| 0,0-dimethyl 0-(2-methoxy-methoxycarbonyl-vinyl) phosphate | 60' | 10' |
| 0,0-diethyl 0-(2-methoxy-2-methoxycarbonyl-vinyl) phosphate | 30' | 30' |
| 0,0-dimethyl 0-(1-ethoxycarbonyl-2-methoxy-2-methoxycarbonyl-vinyl) phosphate | — | 5 h |
| 0,0-diethyl 0-(1-ethoxycarbonyl-2-methoxy-2-methoxycarbonyl-vinyl) phosphate | 70' | 60' |
| 0,0-diethyl 0-(1-trifluoromethyl-2-methoxy-2-methoxycarbonyl-vinyl) phosphate | 43' | 60' |
| 0,0-dimethyl 0-(1-trifluoromethyl-2-methylthio-2-methoxycarbonyl-vinyl) phosphate | — | 100' |
| 0,0-dimethyl 0-(2-methylthio-2-N,N-dimethylcarbamyl-vinyl) phosphorothioate | — | 3 h |
| 0,0-dimethyl 0-(2-methylthio-2-N,N-dimethylcarbamyl-vinyl) phosphate | 40' | 5 h |
| 0,0-diethyl 0-(2-methylthio-2-N,N-dimethylcarbamyl-vinyl) phosphate | 96' | — |
| 0,0-dimethyl 0-(2-ethylthio-2-N,N-dimethylcarbamyl-vinyl) phosphorothioate | — | 5 h |
| 0,0-dimethyl 0-(2-ethylthio-2-N,N-dimethylcarbamyl-vinyl) phosphate | 30' | 2 h |
| 0,0-dimethyl 0-(2-isopropylthio-2-N,N-dimethylcarbamyl-vinyl) phosphate | 90' | 90' |
| 0,0-diethyl 0-(2-isopropylthio-2-N,N-dimethylcarbamyl-vinyl) phosphate | — | 92' |
| 0,0-dimethyl 0-(1-methyl-2-chloro-2-N,N-diethylcarbamyl-vinyl) phosphate (see Table 1) | 3 h | 8 h |

Table 5

| Active Substance | 100% of the animals in dorsal position after x minutes or hours | | | |
|---|---|---|---|---|
| | stable flies | | mosquitoes | |
| | after 1 day | after 8 days | after 1 day | after 8 days |
| 0,0-dimethyl 0-(2-methoxy-2-methoxycarbonyl-vinyl) phosphorothioate | 17' | 40' | 10' | 16' |
| 0,0-dimethyl 0-(2-methoxy-2-methoxycarbonyl-vinyl) phosphate | 25' | 35' | 90' | 90' |
| 0,0-diethyl 0-(1-trifluoromethyl-2-methoxy-2-methoxycarbonyl-vinyl) phosphate | 14' | 30' | 45' | 2 h |

Table 5—Continued

| Active Substance | 100% of the animals in dorsal position after x minutes or hours | | | |
|---|---|---|---|---|
| | stable flies | | mosquitoes | |
| | after 1 day | after 8 days | after 1 day | after 8 days |
| 0,0-diethyl 0-(2-isopropylthio-2-N,N-dimethyl-carbamyl-vinyl) phosphorothioate | 30' | 30' | 30' | 30' |
| 0,0-dimethyl 0-(2-n-propylthio-2-N,N-diethyl-carbamyl-vinyl) phosphorothioate | 30' | 43' | 45' | 54' |
| 0,0-dimethyl 0-(2-methoxy-2-methoxycarbonyl-vinyl) phosphate | 32' | 30' | — | — |
| 0,0-dimethyl 0-(1-ethoxycarbonyl-2-methoxy-2-methoxycarbonyl-vinyl) phosphorothioate | 73' | 82' | — | — |
| 0,0-dimethyl 0-(2-isopropylthio-2-N,N-dimethyl-carbamyl-vinyl) phosphate | 60' | — | — | — |
| 0,0-diehtyl 0-(2-isopropylthio-2-N,N-dimethyl-carbamyl-vinyl) phosphate | 45' | — | — | — |
| 0,0-dimethyl 0-(1-methyl-2-chloro-2-N,N-diethyl-carbamyl-vinyl) phosphate (see Table 1) | 4 h | 5 h | 5 h | 5 h |

3. Effect as insecticidal stomach poison

Potato greens are dipped in a 0.1 percent aqueous solution of the active substance (obtained from a 10 percent emusifiable concentrate). After the coating has dried, Colorado potato beetles (Leptinotarsa decemlineata) are placed on the greens. In the following Table 6 the time is given in minutes and in hours after which all (100 percent) of the animals are in dorsal position.

Table 6

| Active Substance | 100% of the animals in dorsal position after X minutes or hours potato beetle larvae |
|---|---|
| 0,0-dimethyl 0-(2-methoxy-2-methoxycarbonyl-vinyl) phosphate | 75' |
| 0,0-diethyl 0-(2-methoxy-2-methoxycarbonyl-vinyl) phosphate | 90' |
| 0,0-dimethyl 0-(1-ethoxycarbonyl-2-methoxy-2-methoxycarbonyl-vinyl) phosphate | 4 h |
| 0,0-diethyl 0-(1-ethoxycarbonyl)-2-methoxy-2-methoxycarbonyl-vinyl) phosphate | 5 h |
| 0,0-diethyl 0-(1-trifluoromethyl-2-methoxy-2-methoxycarbonyl-vinyl) phosphate | 90' |
| 0,0-dimethyl 0-(2-methylthio-2-N,N-dimethylcarbamyl-vinyl) phosphorothioate | 60' |
| 0,0-dimethyl 0-(2-methylthio-2-N,N-dimethylcarbamyl-vinyl) phosphate | 2 h |
| 0,0-diethyl 0-(2-methylthio-2-N,N-dimethylcarbamyl-vinyl) phosphate | 2 h |
| 0,0-dimethyl 0-(methylthio-2-N,N-dimethylcarbamyl-vinyl) phosphate | 2 h |
| 0,0-dimethyl 0-(2-ethylthio-2-N,N-dimethylcarbamyl-vinyl) phosphate | 115' |
| 0,0-diethyl 0-(2-isopropylthio-2-N,N-dimethylcarbamyl-vinyl) phosphate | 5 h |
| 0,0-dimethyl 0-(2-isopropylthio-2-N,N-dimethylcarbamyl-vinyl) phosphate | 2 h |

The following examples illustrate the production of the new phosphoric acid esters of Formula I. Unless expressly stated otherwise, the temperatures are given in degrees centigrade.

EXAMPLE 1

A mixture of 26.4 g of ethoxyacetic acid ethyl ester and 14.8 g of formic acid ethyl ester is slowly added dropwise to a suspension of 13.6 g of sodium ethylate in 300 ml of benzene (anhydrous). The mixture is stirred for 7 hours at room temperature. Then 29 g of 0,0-dimethyl 0-chlorophosphate, dissolved in 25 ml of benzene (anhydrous), are added dropwise. The reaction mixture is stirred for 24 hours at room temperature and then shaken out with 200 ml of water. The organic phase is separated, dried and freed of solvent. The crude product is distilled in vacuum. The 0,0-dimethyl 0-(2-ethoxy-2-ethoxycarbonyl-vinyl) phosphate has a boiling point of 119°–124°/0.45 mm.

| Analysis: | Calculated: | C 40.3 | H 6.4 | P 11.5 |
|---|---|---|---|---|
| | found: | C 40.3 | H 6.3 | P 11.3 |

EXAMPLE 2 a. 32.2 g of ethanol (anhydrous) are added dropwise to 8 g of sodium, emulsified in 150 ml of toluene (anhydrous), and stirred for one hour at 95°. Then the suspension is cooled to 0°–5° and a mixture of 52.6 g of 2-ethylthio-N,N-dimethylacetamide and 26.5 g of formic acid ethyl ester in 50 ml of ether (anhydrous) is slowly added dropwise. After stirring for 16 hours at 0°–5°, the sodium salt which precipitates is removed by filtration, washed with 300 ml of ether (anhydrous) and dried in vacuum.

b. To a suspension of 9.9 g of this sodium salt in 100 ml of benzene (anhydrous) there is added dropwise a solution of 8 g of 0,0-dimethyl 0-chlorophosphocothioate in 25 ml of benzene (anhydrous). The reaction mixture is stirred for 24 hours at room temperature. After treating with active charcoal, the filtrate is concentrated by evaporation in vacuum. The resultant 0,0-dimethyl 0-(2-ethylthio-2-N,N-dimethylcarbamylvinyl) phosphorothioate is purified by chromatography on a column of silica gel and has a refraction index $n_D^{20} = 1.5243$.

| Analysis: | | | | | |
|---|---|---|---|---|---|
| calculated: | C 36.1 | H 6.1 | N 4.7 | P 9.7 | S 21.4 |
| found: | C 36.0 | H 6.0 | N 4.6 | P 10.2 | S 21.0 |

EXAMPLE 3 a. Following the procedure described in German patent No. 708,513, 6.9 g of sodium are dissolved in 400 ml of isopropanol and then transferred into an autoclave which has been flushed with nitrogen. Carbon monoxide is pressed on at 70° and 10 bar until no more loss of pressure can be registered. Then 39.6 g of methoxyacetic acid ethyl ester is introduced into the autoclave and the carbon monoxide pressure is kept at 40 bar for 7 hours at 70°. After cooling, the mixture is filtered and the filtrate is concentrated by evaporation, whereby the enolic sodium salt which forms separates.

b. The sodium salt which is obtained is suspended in 500 ml of benzene (anhydrous) and cooled in an ice bath to 0° – 6°. Then 43.35 g of 0,0-dimethyl 0-chlorophosphate, dissolved in 50 ml of benzene, are added dropwise. The reaction mixture is stirred for 24 hours at room temperature and then shaken out twice with 150 ml of water. The organic phase is separated, dried and freed from solvent. The crude product is distilled in vacuum. The resultant 0,0-dimethyl 0-(2-methoxy-2-isopropoxycarbonyl-vinyl) phosphate boils at 97°/0.01 mm.

EXAMPLE 4

A mixture of 17.7 g of methoxyacetic acid ethyl ester and 21.9 g of oxalic acid diethyl ester is added dropwise at 0°–6° to a suspension of 6 g of sodium hydride (55–60 percent in mineral oil) in 200 ml of benzene (anhydrous). The mixture is then stirred for 2 hours at 0°–6°, 16 hours at room temperature, and 1 hour at 40°–45°. Then 21.6 g of 0,0-dimethyl 0-chlorophosphate, dissolved in 25 ml of benzene (anhydrous) are added dropwise at 0°–6°. The reaction mixture is stirred for 24 hours at room temperature and then shaken out with 100 ml of water. The organic phase is separated, dried and concentrated by evaporation. The crude product is distilled in vacuum. The 0,0-dimethyl 0-(1,2-bis-ethoxy-carbonyl)-2-methoxy-vinyl) phosphate obtained boils at 136°/0.005 mm.

EXAMPLE 5

The solution of the enolic sodium salt obtained from Example 3a), above, can be reacted directly, without previous evaporation, with the 0,0-dimethyl 0-chlorophosphate. While cooling with an ice bath, 43.35 g of 0,0-dimethyl 0-chlorophosphate are added dropwise to the aforesaid salt solution. The reaction mixture is stirred for 24 hours at room temperature and then evaporated in vacuum. The residue is extracted with 500 ml of ether and the solution obtained is shaken out with 150 ml of water. The organic phase is separated, dried and freed of solvent. After distillation in vacuum, 0,0-dimethyl 0-(2-methoxy-2-isopropoxycarbonyl-vinyl) phosphate is obtained.

The following table contains other examples of phosphates of Formula I which have been prepared by the methods described in the previous examples:

| Compounds | physical data |
| --- | --- |
| 0,0-dimethyl 0-(2-methoxy-2-methoxy-carbonylvinyl) phosphate | |
| 0,0-dimethyl 0-(2-methoxy-2-ethoxy-carbonylvinyl) phosphate | b.p. 85–90°/0,003 Torr |
| 0,0-diethyl 0-(2-methoxy-2-methoxy-carbonylvinyl) phosphate | |
| 0,0-dimethyl 0-(2methoxy-2-n-propoxy-carbonylvinyl) phosphate | b.p. 119–122°/0,02 Torr |
| 0,0-dimethyl 0-(2-propoxy-2-methoxy-carbonylvinyl) phosphate | b.p. 122–123°/0,01 Torr |
| 0,0-dimethyl 0-(2-isopropoxy-2-methoxy-carbonylvinyl) phosphate | b.p. 109–110°/0,005 Torr |
| 0,0-dimethyl 0-(2-propoxy-2-ethoxy-carbonylvinyl) phosphate | |
| 0,0-dimethyl 0-(2-propoxy-2-propoxy-carbonylvinyl) phosphate | |
| 0,0-dimethyl 0-(2-propoxy-2-pentyloxy-carbonylvinyl) phosphate | |
| 0,0-dimethyl 0-(2-pentyloxy-2-pentyloxy-carbonylvinyl) phosphate | |
| 0,0-diethyl 0-(2-methoxy-2-isopropoxy-carbonylvinyl) phosphate | b.p. 104–105°/0,02 Torr |
| 0,0-diethyl 0-(2-ethoxy-2-ethoxycarb-onylvinyl) phosphate | |
| 0,0-dimethyl 0-(1,2-dimethoxycarbonyl-2-methoxy-vinyl) phosphate | b.p. 138–139°/0,015 Torr |
| 0,0-diethyl 0-(2-n-propoxy-2-methoxy-carbonylvinyl) phosphate | b.p. 104–108°/0,04 Torr |
| 0,0-dimethyl 0-(1-ethoxycarbonyl-2-methoxy-2-methoxycarbonylvinyl) phosphate | $n_D^{20}= 1,4522$ |
| 0,0-dimethyl 0-(1-ethoxycarbonyl-2-methoxy-2-isopropoxycarbonylvinyl) phosphate | b.p. 134–137°/0,01 Torr |
| 0,0-diethyl 0-(1-ethoxycarbonyl-2-methoxy-2-methoxycarbonylvinyl) phosphate | $n_D^{20}= 1,4505$ |

| Compounds | physical data |
| --- | --- |
| 0,0-diethyl 0-(1,2-diethoxycarbonyl-2-methoxyvinyl) phosphate | b.p. 133–137°/0,005 Torr |
| 0,0-dimethyl 0-(1-trifluormethyl-2-methoxy-2-methoxycarbonylvinyl) phosphate | b.p. 102–106°/0,5 Torr |
| 0,0-dimethyl 0-(1-trifluormethyl-2-methoxy-2-ethoxycarbonylvinyl) phosphate | b.p. 83–88°/0,05 Torr |
| 0,0-dimethyl 0-(1-trifluormethyl-2-methoxy-2-isopropoxycarbonylvinyl) phosphate | b.p. 88–89°/0,06 Torr |
| 0,0-diethyl 0-(1-trifluormethyl-2-methoxy-2-methoxycarbonylvinyl) phosphate | $n_D^{20}= 1,4165$ |

| Compounds | physical data |
|---|---|
| O,O-dimethyl O-(1-trifluormethyl-2-methylthio-2-methoxycarbonylvinyl) phosphate | $n_D^{20}= 1,4421$ |
| O,O-dimethyl O-(2-methylthio-2-N,N-dimethylcarbamylvinyl) phosphate | $n_D^{20}= 1,5038$ |
| O,O-diethyl O-(2-methylthio-2-N,N-dimethylcarbamylvinyl) phosphate | $n_D^{20}= 1,4790$ |
| O,O-dimethyl O-(2-ethylthio-2-N,N-dimethylcarbamylvinyl) phosphate | $n_D^{20}= 1,4985$ |
| O,O-dimethyl O-(2-n-propylthio-2-N,N-diethylcarbamylvinyl) phosphate | $n_D^{20}= 1,4856$ |
| O,O-dimethyl O-(2-isopropylthio-2-N,N-dimethylcarbamylvinyl) phosphate | $n_D^{20}= 1,4900$ |
| O,O-diethyl O-(2-isopropylthio-2-N,N-dimethylcarbamylvinyl) phosphate | $n_D^{20}= 1,4797$ |
| O,O-dimethyl O-(2-methoxy-2-methoxycarbonylvinyl) phosphorothioate | |
| O,O-dimethyl O-(2-methoxy-2-ethoxycarbonylvinyl) phosphorothioate | |

| Compounds | physical data |
|---|---|
| O,O-dimethyl O-(2-methoxy-2-isopropoxycarbonylvinyl) phosphorothioate | b.p. 103–104°/0,04 Torr |
| O,O-dimethyl O-(2-methoxy-2-sec.butoxycarbonylvinyl) phosphorothioate | b.p. 113–115°/0,05 Torr |
| O,O-dimethyl O-(2-propoxy-2-methoxycarbonylvinyl) phosphorothioate | b.p. 121–122°/0,01 Torr |
| O,O-dimethyl O-(2-n-propoxy-2-ethoxycarbonylvinyl) phosphorothioate | b.p. 116–117°/0,01 Torr |
| O,O-dimethyl O-(2-n-propoxy-2-n-propoxycarbonyl-vinyl) phosphorothioate | b.p. 127–136°/0,03 Torr |
| O,O-dimethyl O-(2-n-propoxy-2-n-pentyloxy-vinyl) phosphorothioate | b.p. 106–110°/0,01 Torr |
| O,O-dimethyl O-(2-n-pentyloxy-2-n-pentyloxycarbonylvinyl) phosphorothioate | b.p. 118–124°/0,04 Torr |
| O,O-dimethyl O-(2-methylthio-2-ethoxycarbonylvinyl) phosphorothioate | $n_D^{20}= 1,5350$ |
| O,O-dimethyl O-(2-methylthio-2-N,N-dimethylcarbamylvinyl) phosphorothioate | |
| O,O-dimethyl O-(2-n-propylthio-2-N,N-diethylcarbamylvinyl) phosphorothioate | |
| O,O-dimethyl O-(2-isopropylthio-2-N,N-dimethylcarbamylvinyl) phosphorothioate | |
| O,O-dimethyl O-(2-propoxy-2-ethoxycarbonylvinyl) phosphorothioate | |
| O,O-dimethyl O-(2-pentyloxy-2-pentyloxycarbonyl-vinyl) phosphorothioate | |
| O,O-dimethyl O-(1-ethoxycarbonyl-2-methoxy-2-methoxycarbonylvinyl) phosphorothioate | b.p. 135–138°/0,05 Torr |
| O,O-diethyl O-(2-methoxy-2-methoxycarbonylvinyl) phosphorothioate | b.p. 103–105°/0,01 Torr |

| Compounds | physical data |
|---|---|
| O,O-diethyl O-(2-methoxy-2-ethoxycarbonylvinyl) phosphorothioate | b.p. 111–113°/0,02 Torr |
| O,O-diethyl O-(2-ethoxy-2-ethoxycarbonylvinyl) phosphorothioate | b.p. 99–101°/0,03 Torr |
| O,O-diethyl O-(2-n-propoxy-2-methoxycarbonylvinyl) phosphorothioate | b.p. 109–110°/0,03 Torr |
| O,O-diethyl O-(2-methylthio-2-ethoxycarbonylvinyl) phosphorothioate | $n_D^{20}= 1,5100$ |
| O,O-diethyl O-(2-methylthio-2-N,N-dimethylcarbamylvinyl) phosphorothioate | $n_D^{20}= 1,5169$ |
| O,O-diethyl O-(2-ethylthio-2-N,N-dimethylcarbamylvinyl) phosphorothioate | $n_D^{20}= 1,5110$ |
| O,O-diethyl O-(2-n-propylthio-2-N,N-diethylcarbamylvinyl) phosphorothioate | |
| O,O-diethyl O-(2-isopropylthio-2-N,N-dimethylcarbamylvinyl) phosphorothioate | $n_D^{20}= 1,5085$ |
| O,O-Di-n-propyl O-(2-n-propoxy-2-n-propoxycarbonylvinyl) phosphorothioate | |

The production of pesticidal compositions according to the invention is performed in known manner by intimately mixing and grinding the active substances of the Formula I with suitable carriers, optionally with the addition of dispersing agents or solvents, which are inert towards the active substances. The novel active substances can be prepared in the following forms:

solid preparations:
dusts, scattering agents, granulates, (coated granulates, impregnated granulates and homogeneous granulates);

water-dispersible concentrates of the active substance:
wettable powders, pastes, emulsions;

liquid preparations:
solutions, aerosols.

The concentration of active substance in these preparations is from 0.01 to 80 percent by weight. In the case of concentration type formulations according to this invention the amount of active substance in these compositions is generally 0.5 to 80 percent by weight. The concentration of active substance in application type formulations usually ranges from 0.1 to 1.5 percent, preferably from 0.01 to 0.5 percent by weight. Other biocidally active substances or agents can be admixed with the agents according to the invention. Thus, in addition to the said active substances of the Formula I and salts thereof, the new compositions contain, for example, other insecticides, fungicides, bactericides, fungistatic and bacteriostatic substances or nematocides in order to broaden the range of action. The compositions according to the invention may further contain plant fertilizers, trace elements etc.

The following forms for application of pesticidal compositions according to the invention are presented to illustrate the invention, where not expressly stated otherwise, "parts" mean parts by weight.

Dust

The following ingredients are used to produce a) a 5% and b) a 2% dust:
a)     5 parts of 0,0-dimethyl 0-(2-methoxy-2-ethoxy-carbonyl-vinyl) phosphate,
       95 parts of talcum,
b)     2 parts of 0,0-dimethyl 0-(2-methoxy-2-methoxy-carbonyl-vinyl) phosphorothioate,
       1 part of highly dispersed silicic acid,
       97 parts of talcum.

The active substances are mixed and ground with the carriers. The dusts obtained are used, for example, for the control of cockroaches, etc. in buildings, but also in the protection of plants.

Granulate

The following ingredients are used to produce a 5% granulate:
    5 parts of 0,0-dimethyl 0-(2-ethylthio-2-N,N-dimethyl carbamyl-vinyl) phosphorothioate,
    0.25 part of epichlorohydrin,
    0.25 part of cetyl polyglycol ether,
    3.50 parts of polyethylene glycol ("Carbowax"),
    91 parts of kaolin (granular size 0.3 — 0.8 mm).

The active ingredient is mixed with epichlorohydrin and dissolved with 6 parts of acetone, then the polyethylene glycol and cetyl polyglycol ether are added. The resulting solution is sprayed onto kaolin and then the acetone is evaporated in vacuum. The granulate obtained is suitable for the protection of plants and stored goods.

Wettable powder

To produce a a) 40%, b) 50%, c) 25% and d) 10% wettable powder, the following components are used:
a)   40 parts of 0,0-dimethyl 0-(2-ethoxy-2-ethoxy-carbonyl-vinyl) phosphate,
     5 parts of sodium lignin sulphonate,
     1 part of sodium dibutyl-naphthalene sulphonate,
     54 parts of silicic acid,
b)   50 parts of 0,0-dimethyl 0-(2-methoxy-2-methoxy-carbonyl-vinyl) phosphorothioate,
     5 parts of alkyl aryl sulphonate ("Tinovetine B")
     10 parts of calcium lignin sulphonate,
     1 part of Champagne chalk/hydroxyethyl cellulose cellulose mixture (1:1),
     20 parts of silicic acid,
     14 parts of kaolin,
c)   25 parts of 0,0-dimethyl 0-(2-ethylthio-2-N,N-dimethylcarbamyl-vinyl) phosphorothioate,
     5 parts of the sodium salt of oleylmethyl tauride,
     2.5 parts of naphthalene sulphonic acid/formaldehyde condensation product,
     0.5 part of carboxymethyl cellulose,
     5 parts of neutral potassium aluminium silicate,
     62 parts of kaolin,
d)   10 parts of 0,0-dimethyl 0-(2-ethoxy-2-ethoxy-carbonyl-vinyl) phosphate,
     3 parts of mixture of sodium salts of saturated fatty alcohol sulphates,
     5 parts of naphthalene sulphonic acid/formaldehyde condensation product,
     82 parts of kaolin.

The active substances are intemately mixed in suitable mixers with the additives and ground on appropriate mills and rollers. Wettable powders are obtained which may be diluted with water to suspensions of any desired concentration. Such suspensions are chiefly used in plant protection for the control of biting and sucking insects.

Spray

To produce a) a 5% and b) a 2% spray, the following components are used:
a)     5 parts of 0,0-dimethyl 0-(2-ethoxy-2-ethoxy)-carbonyl-vinyl) phosphate,
       1 part of epichlorohydrin,
       94 parts of benzine (boiling range 160–190°),
b)     2 parts of 0,0-dimethyl 0-(2-methoxy-2-methoxy-carbonyl-vinyl) phosphorothioate,
       3 parts of 4,4'-dichlorodiphenyl-trichloroethane
       95 parts of kerosene.

These solutions are sprayed with pressure sprayers. The solution (a) is advantageously used for the control of aphids on fruit trees and other plants. The solution (b) is used in particular for the control of flies and mosquitoes in living quarters, warehouses and slaughterhouses.

Emulsifiable concentrate

For the production of a 25% emulsifiable concentrate:
    25 parts of 0,0-dimethyl 0-(2-ethoxy-2-ethoxy-carbonylvinyl) phosphate,
    5 parts of epoxidized vegetable oil,
    5 parts of composite emulsifier (alkylaryl-polyethylene glycol/calcium alkylaryl-sulphonate)
    65 parts of xylene are mixed together. This concentrate may be diluted with water to any desired concentration. Such concentrates are particularly suitable for the control of insects in granaries, warehouses and on cultivated plants.

We claim:

1. An insecticidal composition which comprises, as the insecticidally active ingredient an insecticidally effective amount of a compound of the formula

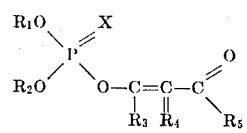

[(I)]

wherein
- X represents oxygen or sulphur,
- $R_1$ and $R_2$ each independently represents lower alkyl,
- $R_3$ represents hydrogen, lower alkoxycarbonyl or trifluoromethyl, and when
- $R_4$ represents lower alkoxy, lower alkylthio or di-loweralkylamino,
- $R_5$ represents lower alkoxy or when
- $R_4$ represents lower alkylthio,
- $R_5$ represents di-lower-alkylamino in admixture with a dispersing agent.

2. A composition according to claim 1, wherein the active ingredient is 0,0-dimethyl 0-(2-methoxy-2-ethoxycarbonyl-vinyl) phosphate.

3. A composition according to claim 1, wherein the active ingredient is 0,0-dimethyl 0-(2-methoxy-2-isopropoxycarbonyl-vinyl) phosphate.

4. A composition according to claim 1, wherein the active ingredient is 0,0-dimethyl 0-(2-n-propoxy-2-methoxy-carbonyl-vinyl) phosphorothioate.

5. A composition according to claim 1, wherein the active ingredient is 0,0-dimethyl 0-(2-n-propoxy-2-n-propoxycarbonyl-vinyl) phosphate.

6. A composition according to claim 1, wherein the active ingredient is 0,0-dimethyl 0-(1-ethoxycarbonyl-2-methoxy-2-methoxycarbonyl-vinyl) phosphate.

7. A composition according to claim 1, wherein the active ingredient is 0,0-diethyl 0-(2-isopropylthio-2-N,N-dimethylcarbonyl-vinyl) phosphorothioate.

8. A method for controlling insects which comprises applying thereto an insecticidally effective amount of a compound of the formula

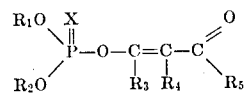

wherein
- X represents oxygen or sulfur, $R_1$ and $R_2$ each independently represents lower alkyl,
- $R_3$ represents hydrogen, lower alkoxycarbonyl or trifluoromethyl and when
- $R_4$ represents lower alkoxy, lower alkylthio or di-lower-alkylamino
- $R_5$ represents lower alkoxy, or when
- $R_4$ represents lower alkylthio,
- $R_5$ represents a di-lower-alkylamino radical.

9. A method according to claim 8 in which the compound is 0,0dimethyl 0-(2-methoxy-2ethoxycarbonyl-vinyl) phosphate.

10. A method according to claim 8 in which the compound is 0,0-dimethyl 0-(2-methoxy-2isopropoxycarbonyl-vinyl phosphate.

11. A method according to claim 8 in which the compound is 0,0-dimethyl 0-(2-n-propoxy-2-methoxycarbonyl-vinyl) phosphorothioate.

12. A method according to claim 8 in which the compound 0,0-dimethyl 0-(2-n-propoxy-2-n-propoxycarbonyl-vinyl) phosphate.

13. A method according to claim 8 in which the compound is 0,0-dimethyl 0-(1-ethoxycarbonyl-2-methoxy-2-methoxycarbonyl-vinyl) phosphate.

14. A method according to claim 8 in which the compound is 0,0-diethyl 0-(2-isopropylthio-2-N,N-dimethylcarbonylvinyl) phosphorothioate.

* * * * *